No. 865,472. PATENTED SEPT. 10, 1907.
H. W. ALDEN.
ROLLER BEARING.
APPLICATION FILED SEPT. 21, 1906.
2 SHEETS—SHEET 1.
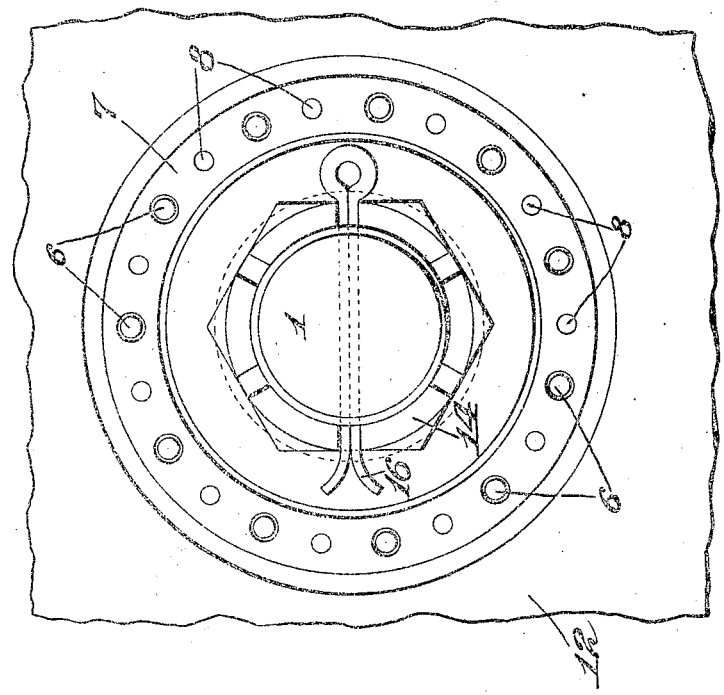
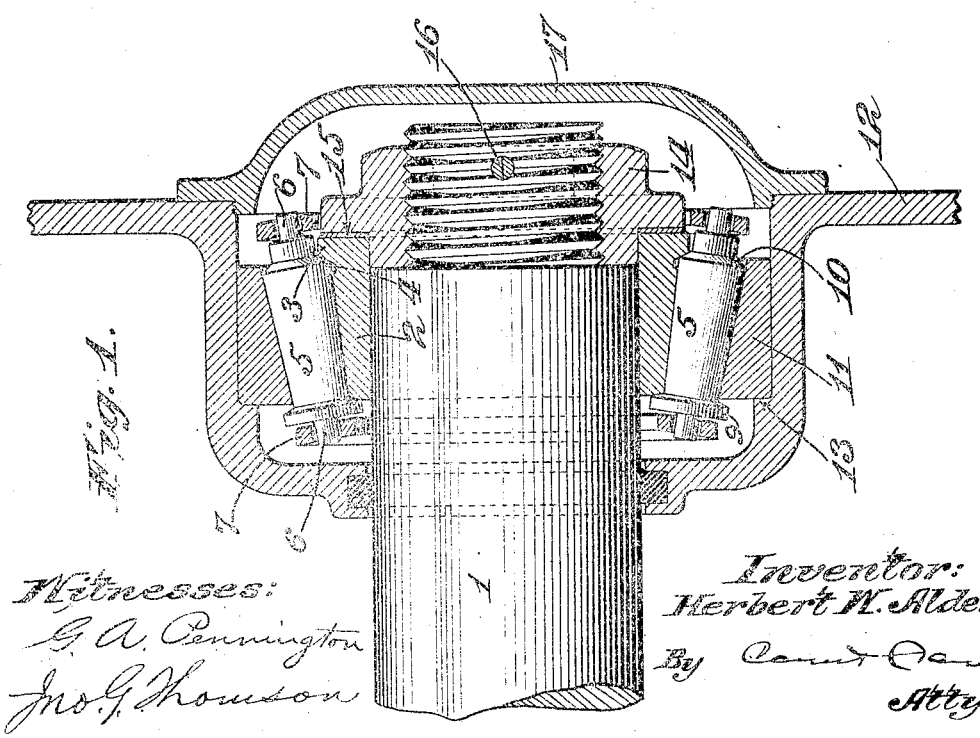

No. 865,472. PATENTED SEPT. 10, 1907.
H. W. ALDEN.
ROLLER BEARING.
APPLICATION FILED SEPT. 21, 1906.
2 SHEETS—SHEET 2.
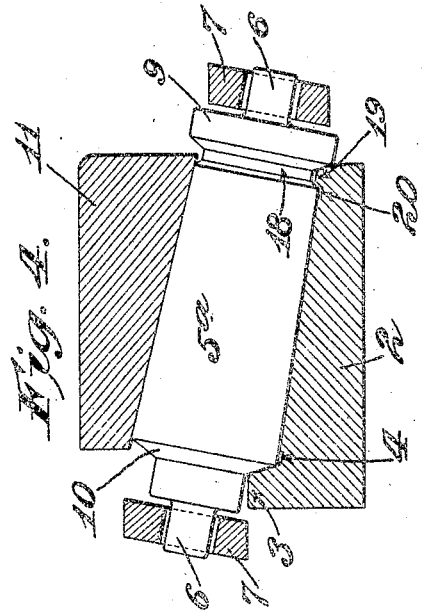
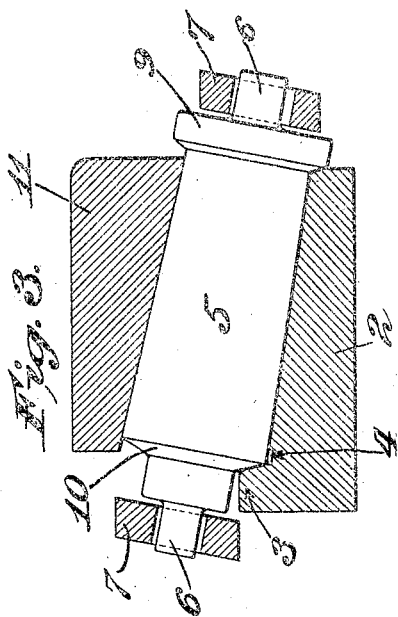
Witnesses:
G. A. Pennington
Jno. G. Thomson
Inventor:
Herbert W. Alden,
By Paul Carr,
Attys.

UNITED STATES PATENT OFFICE.

HERBERT W. ALDEN, OF CANTON, OHIO, ASSIGNOR TO TIMKEN ROLLER BEARING AXLE COMPANY, OF CANTON, OHIO, A CORPORATION OF OHIO.

ROLLER-BEARING.

No. 865,472.    Specification of Letters Patent.    Patented Sept. 10, 1907.

Application filed September 21, 1906. Serial No. 335,539.

*To all whom it may concern:*

Be it known that I, HERBERT W. ALDEN, a citizen of the United States, and a resident of the city of Canton, county of Stark, and State of Ohio, have invented a new and useful Improvement in Roller-Bearings, of which the following is a specification.

My invention relates to roller bearings, and has for its principal objects to improve the roller bearing described in Letters Patent of Timken and Heinzelman, No. 606,635, dated June 28, 1898, so as to simplify the construction thereof, render the same more compact, decrease the cost of manufacture, and secure other advantages hereinafter more fully appearing.

My invention consists in the parts and in the arrangements and combinations of parts hereinafter described and claimed.

In the accompanying drawing, which forms part of this specification, and wherein like symbols refer to like parts wherever they occur, Figure 1 is a longitudinal sectional view of my bearing applied to a motor shaft; Fig. 2 is a view of the outer end thereof with the dust cap removed; Fig. 3 is a sectional detail view of a portion of the bearing surface showing a single roller in position; and, Fig. 4 is a view similar to Fig. 3 showing a roller of modified form.

Mounted upon the end of a motor shaft 1 is a conical sleeve 2 which is provided at its outer end with an annular rib or enlargement 3. The inner face or shoulder of the rib 3 is beveled or inclined, and preferably a circumferential groove 4 is formed at the base of the shoulder in order to provide clearance for the grinding tool in the process of manufacture. The smaller end of the conical sleeve is also beveled or inclined.

Surrounding the conical sleeve 2 and bearing thereon are a series of conical rollers 5. These rollers 5 have axial pintles or projections 6 which rest in holes or perforations provided therefor in a skeleton cage. This cage comprises parallel rings 7 secured together by means of rods 8. The cage serves to keep the rollers properly spaced and tends to restore to proper position any roller that may have become canted.

The smaller end of each roller is provided with an annular rib or enlargement 9 whose inner shoulder is beveled to correspond with the bevel of the smaller end of the conical sleeve 2. The larger end of the roller 5 is reduced in diameter to clear the rib 3 on the conical sleeve, and the shoulder 10 thereby formed is beveled to correspond with the bevel of said rib 3. The shoulders of the roller are so located that when one of them bears against the smaller end of the conical sleeve 2, the other shoulder 10 of the roller will bear against the shoulder of the rib 3 at the larger end of said conical sleeve. Surrounding the rollers is the outer bearing piece 11, which, in the construction illustrated in the drawing consists of a cylindrical shell or sleeve whose inner face is made conical.

Fig. 1 illustrates a convenient means of applying my bearing to a shaft, for instance, to a shaft of an electric motor. In this case, the outer bearing piece or shell 11 is mounted in the hub or motor head provided therefor in the frame work 12, and its inner end abuts against a shoulder 13 in said hub. The inner bearing piece or sleeve 2 is mounted on the motor shaft, and is held against longitudinal movement by means of a nut 14 which works on the threaded end of the shaft and is arranged to constitute an abutment for said inner sleeve. In practice this nut is screwed home, the adjustment of the inner bearing being effected by means of a greater or less number of shims or washers 15 interposed between the nut and the end of said inner bearing piece. The nut is locked in position by means of ordinary cotter pins 16. The shaft is provided with a similar arrangement at the opposite end. The outer end of the hub is screw threaded and provided with a threaded cap 17 designed to exclude dirt from the bearing but to permit easy access thereto.

On account of the rollers being formed with a shoulder at each end to bear against corresponding portions of the inner bearing piece, the tendency of the rollers to cant is to a large extent overcome. The inclination of the shoulders has a tendency to reduce the friction at the ends of the rollers and to tight rollers that may have become canted. By reason of the shoulders at both ends of the roller being arranged to bear simultaneously against the corresponding surfaces of the inner shell, the disadvantage of endwise friction is to a large extent overcome. For the same reason, the wear at the ends of the roller progresses evenly.

By the construction hereinbefore described, a greater bearing surface is secured for a given length of roller than has heretofore been practicable, so that it is capable of use under conditions requiring great compactness of construction. My bearing is obviously capable of general use as a journal bearing or a vehicle bearing or the like, and I do not wish to be restricted to its use in connection with motor shafts.

The modification illustrated in Fig. 4 consists merely in forming a groove 18 near the outer or smaller end of the roller and in forming a corresponding rib 19 on the outer or smaller end of the conical shell 2 to project into said groove. Both the groove and the rib have beveled or inclined sides and preferably a slight groove or depression 20 is formed on the shoulder at the base of the rib. In other respects the roller 5ª shown in Fig. 4 is similar to the roller 5 hereinbefore described.

What I claim as my invention and desire to secure by Letters Patent is:

1. A roller bearing comprising a conical inner bearing piece, a conical outer bearing piece, and a series of conical rollers between said bearing pieces, each of said rollers having a rib extending radially beyond the bearing surface of the roller and overlapping the smaller end of the inner bearing piece.

2. A roller bearing comprising a conical inner bearing piece whose larger end has a rib, extending radially inward beyond the main bearing surface of said bearing piece a conical outer bearing piece, and a series of rollers between said bearing pieces, each of said rollers having a shoulder at its larger end arranged to coöperate with the shoulder on said rib.

3. A roller bearing comprising a conical inner bearing piece whose larger end has a rib extending radially inward beyond the main bearing surface of said bearing piece and a groove at the base of said rib, a conical outer bearing piece, and a series of rollers between said bearing pieces, each of said rollers having its diameter reduced at its larger end to form a shoulder to coöperate with the shoulder on said rib.

4. A roller bearing comprising a conical inner bearing piece provided with a rib at its larger end, a conical outer bearing piece, and a series of rollers between said bearing pieces, each of said rollers having a rib on its smaller end extending radially beyond the bearing surface of the roller and arranged to overlap and bear against the smaller end of said inner bearing piece, and the larger end of said roller being arranged to bear against the rib of said piece.

5. A roller bearing comprising a conical inner bearing piece provided with a rib at its larger end extending radially inward beyond the main bearing surface of said bearing piece and having said rib and its smaller end beveled, a conical outer bearing piece, and a series of rollers between said bearing pieces, each of said rollers having a beveled rib on its smaller end extending radially beyond the bearing surface of the rollers and arranged to bear against the beveled smaller end of said inner bearing piece, and the larger end of said roller being arranged to bear against the beveled portion of the rib of said inner bearing piece.

6. A roller bearing comprising a conical inner bearing piece provided with a rib at its larger end and extending radially inward beyond the main bearing surface of said bearing piece a groove alongside of said rib and having said rib and its smaller end beveled, a conical outer bearing piece, and a series of rollers between said bearing pieces, each of said rollers having a beveled rib on its smaller end extending radially beyond the bearing surface of the roller and arranged to bear against the beveled smaller end of said inner bearing piece, and the upper end of said roller being arranged to bear against the beveled portion of the rib of said inner bearing piece.

7. A roller bearing comprising a conical inner bearing piece having a rib at its smaller end, a conical outer bearing piece, and a series of rollers between said bearing pieces, each of said rollers having a rib extending radially beyond the bearing surface of the roller and overlapping the smaller end of the inner bearing piece and a groove coöperating with the rib on said inner bearing piece.

8. A roller bearing comprising an inner bearing piece provided with a rib at its larger end extending radially inward beyond the main bearing surface of said bearing piece and having said rib and its smaller end beveled, a conical outer bearing piece, and a series of rollers between said bearing pieces, each of said rollers having a beveled rib on its smaller end extending radially beyond the bearing surface of the roller and arranged to bear against the beveled smaller end of said inner bearing piece, and the larger end of said roller being arranged to bear against the beveled portion of the rib of said inner bearing piece, and means for effecting endwise relative movement of said bearing pieces to adjust said bearing.

9. A roller bearing comprising a conical inner bearing piece provided with beveled ribs at its ends, extending radially inward beyond the main bearing surface of said bearing piece, a conical outer bearing piece, and a series of rollers between said bearing pieces, each of said rollers having a groove to coöperate with the rib at the smaller end of said inner bearing piece and having a rib at its smaller end extending radially beyond the bearing surface of the roller and overlapping said rib, each of said rollers also having a shoulder at its larger end arranged to bear against the shoulder of the rib on the larger end of said inner bearing piece.

10. A roller bearing comprising a conical inner bearing piece provided with a rib at its larger end and having said rib and its smaller end beveled, a conical outer bearing piece and a series of spaced rollers between said bearing pieces, said rollers being mounted in a skeleton cage, each of said rollers having a beveled rib on its smaller end arranged to bear against the beveled smaller end of said inner bearing piece and the larger ends of said roller bearings arranged to bear against the beveled portion of the rib of said inner bearing piece.

In testimony whereof I have signed my name to this specification in the presence of two subscribing witnesses this 8th day of September, 1906, at Canton, Stark county, Ohio.

HERBERT W. ALDEN.

Witnesses:
CLARENCE C. MILLER,
C. L. WHITE.